J. S. ROYCE.
Running-Gear.
No. 5,107.
Patented May 8, 1847.
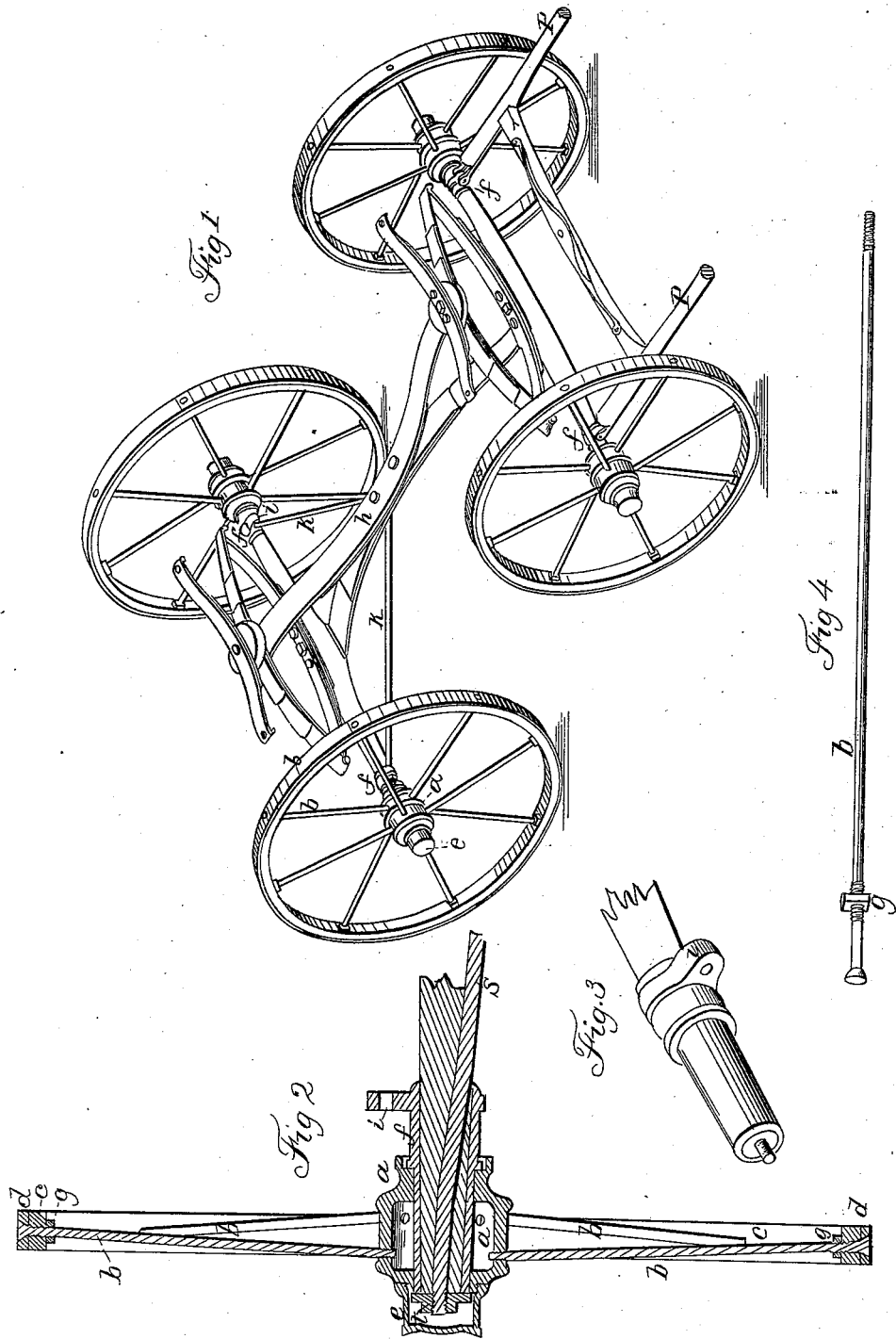

UNITED STATES PATENT OFFICE.

JNO. S. ROYCE, OF LEICESTER, NEW YORK.

CARRIAGE.

Specification of Letters Patent No. 5,107, dated May 8, 1847; Antedated February 5, 1847.

*To all whom it may concern:*

Be it known that I, JOHN S. ROYCE, of Leicester, in the county of Livingston and State of New York, have invented sundry Improvements in the Manner of Constructing Buggies or other Four-wheeled Vehicles; and I do hereby declare the following to be a full, clear, and exact description thereof, reference being had to the accompanying drawings, making a part of this specification, in which—

Figure 1, is a perspective view of the running gear of a buggy. Fig. 2, is a vertical section of a wheel and pipe-skein attached to a broken section of an axle; Fig. 3 is a perspective view of a metallic pipe skein, and Fig. 4 is an enlarged view of a metallic spoke detached.

The nature of my improvements in the manner of constructing buggies and other four wheeled vehicles, consists first, in the manner of constructing the suspension wheels made use of; by my improved method of constructing which, I give to them stiffness, lightness, strength and durability, to a degree never before attained, and also a susceptibility for prompt and economical repairs; secondly, in the attachment of metallic pipe skeins $f$, $f$, to the ends of the axles for the wheels to run upon, having loops $i$ cast upon their inner ends for the purpose of connecting those (skeins) upon the after axle with the perch $h$, by means of the braces $k$, $k$; and those on the forward axle directly with the shafts $p$, $p$, (or a pole).

The wheels are composed of the metallic hub $a$, the metallic tension spokes $b$, $b$, the bent felly $c$, the tire $d$, and the screw nuts $g$, $g$, united as follows: The spokes pass through the tire, felly, and nut $g$, and are screwed into the hub $a$; conical heads on the outer ends of the spokes, fit into countersinks in the tire. The spokes are slightly enlarged for the distance of a few inches from their heads, upon which enlargement a screw thread is cut for the reception of the screw nuts $g$, $g$. The nuts $g$, $g$, confine the felly securely to the tire, adding to the stiffness and strength of the felly, and preventing it from springing from the tire when the wheel comes in violent contact with a stone or other hard substance, and also securing the heads of the spokes so firmly in the countersinks in the tire, that they will not work loose by the jarring of the wheel. Should one of the spokes be broken or injured, by unscrewing the nut $g$, and allowing it to play loosely upon the spoke, and unscrewing the inner end of the same from the hub, the spoke can be drawn out and another inserted in its place. The metallic pipe skeins $f$, $f$, are secured to the ends of each axle, and the wheels are also secured to the skeins, by means of a metallic rod $s$, and nuts $t$; the rod $s$, passes through a groove in the under side of the axle, the ends of which extend a short distance beyond the ends of the axle, and have screws cut upon them that receive the nuts $t$, which, extending beyond the periphery of the skeins, act against the outer ends of the hubs, thereby securing the same upon the skeins $f$, at the same time that they secure the pipe skeins to the axle, the rod $s$, also serving to strengthen the axle. Metallic caps $e$, $e$, are screwed to the outer ends of the hubs $a$, $a$, concealing the nuts $t$, $t$, and preventing the dust from penetrating between the pipe skeins $f$, $f$, and the hubs of the wheels.

A loop $i$, is cast upon the inner end of each of the pipe skeins $f$, $f$, for the purpose connecting those (skeins) on the after axle directly with the perch $h$, by means of the braces $k$, $k$; and the connecting the shafts $p$, $p$, (or pole) directly with the skeins on the forward axle, as represented in Fig. 1, by which arrangement the entire draft upon the shafts acts directly upon the pipe skeins, thereby relieving the axles from strain and reducing their liability to be broken; also greatly simplifying and economizing the expense of construction, and in case of their being broken in a situation where a wheelwright cannot be obtained; a substitute for the broken axle can be readily fitted in with no other tools than an ax and an auger.

Having thus fully described the nature of my improvements in the manner of constructing buggies or other four wheeled vehicles, what I claim as new and desire to secure by Letters Patent is—

1. The manner of stiffening and supporting the felly of the wheels, securing the same to the tire, and firmly fastening the conical heads of the spokes in the countersinks in the tire by means of the screw nuts $g, g,$ (working on screws on the spokes,) substantially in the manner herein set forth.

2. I also claim the constructing the pipe skeins $f, f,$ with loops ($i,$) on their inner ends, and the connecting the same with the perch $h$, and with the shafts ($p, p,$) (or pole) substantially in the manner and for the purpose herein set forth.

JOHN S. ROYCE.

Witnesses:
Z. C. ROBBINS,
N. BARLOW.